US007467022B2

(12) United States Patent
Bhagwat et al.

(10) Patent No.: US 7,467,022 B2
(45) Date of Patent: Dec. 16, 2008

(54) METHOD FOR FABRICATING A HEARING AID SHELL AND MOLD INCORPORATING TEST FITTING BY THE USER

(75) Inventors: Vijaykiran Bhagwat, Cranbury, NJ (US); Steven Owens, Denville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 323 days.

(21) Appl. No.: 11/398,785

(22) Filed: Apr. 6, 2006

(65) Prior Publication Data

US 2007/0234571 A1 Oct. 11, 2007

(51) Int. Cl.
*G06F 19/00* (2006.01)

(52) U.S. Cl. .......................... 700/98; 700/118; 381/312

(58) Field of Classification Search .................. 700/98, 700/118; 381/68, 312, 322, 328; 623/909, 623/912; 264/222; 181/130, 135; 425/2
See application file for complete search history.

(56) References Cited

U.S. PATENT DOCUMENTS 5,487,012 A * 1/1996 Topholm et al. ............ 700/163
5,804,109 A * 9/1998 Perkins ...................... 264/40.1
6,533,062 B1 * 3/2003 Widmer et al. .............. 181/129
6,731,997 B2 * 5/2004 Hessel et al. .................. 700/98
7,162,323 B2 * 1/2007 Brumback et al. .......... 700/118
7,328,080 B2 * 2/2008 Fu et al. ...................... 700/118
2004/0133604 A1 * 7/2004 Lordo ..................... 707/104.1
2008/0056518 A1 * 3/2008 Burrows et al. ............. 381/314

* cited by examiner

*Primary Examiner*—Alexander J Kosowski
(74) *Attorney, Agent, or Firm*—Schiff Hardin LLP

(57) ABSTRACT

In a method for fabricating a hearing aid device, a patient visits an audiologist at a dispenser location, and is examined to determine electronic settings for a hearing aid to correct the patient's hearing impairment. At the same visit, an ear mold of the patient is obtained, which is scanned to produce a three-dimensional data set, from which a prototype is produced from the hearing aid data set, that does not contain any electronic components, and the prototype is test fitted with the patient. By interaction between the patient and the audiologist, the prototype is modified as needed. When the prototype is acknowledged by the patient as being a comfortable fit, the three-dimensional data that were used to create the acceptable prototype are electronically transmitted to a fabrication site, at which the hearing device is manufactured therefrom. The hearing device is then sent to a location at which it is available to the patient.

8 Claims, 2 Drawing Sheets

METHOD FOR FABRICATING A HEARING AID SHELL AND MOLD INCORPORATING TEST FITTING BY THE USER

BACKGROUND OF THE INVENTION

1. Field of the Invention

The present invention concerns a method for fabricating a hearing aid shell and a mold from which a hearing aid will be produced, that allow a test fitting by a user (wearer) of the hearing aid before the final hearing aid device is manufactured.

2. Description of the Prior Art

Hearing-impaired patients often reject a hearing aid device due to a poor fit. This results in longer patient care cycles while re-manufacturing the device in order to put it in a form that the patient will find acceptable. Returns to the factory or manufacturing facility also create waste and additional costs that could be avoided if the initial device achieved a satisfactory (comfortable) fit in the ear canal of the hearing-impaired person.

The primary reason for such factory returns is that patient acceptance, which is normally based on a comfortable and stable fit in the ear canal, can be verified with certainty only after the finished device is manufactured and shipped back to the dispenser site, when for the first time it is placed in the ear canal of the patient.

The conventional procedure for producing a hearing aid with a fit that is comfortable for the patient is schematically illustrated in FIG. 1. As shown in FIG. 1, the patient visits a dispenser (retail) location, and is examined by an audiologist. Appropriate procedures are performed to determine the hearing impairment of the patient, referred to in general as production of an audiogram. From this, the required features of the hearing aid device are determined, such as the amplification power, the frequency response, special programs for particular audio environments, etc. Based on all of this information, the audiologist recommends a suitable hearing aid type. Another factor which may enter into this determination is a preference on the part of the patient for a hearing aid having the smallest possible size.

Audiologists generally have different hearing aids available for demonstration purposes. These are typically built to the dimensions and shape of the audiologist's ear. The patients can hold and examine these actual items, but the patients cannot determine exactly how the hearing aid will feel in the patient's own ear, because the demonstration sample was manufactured for a different individual.

For customizing the shape of the hearing aid device to the patient's ear, the audiologist makes a mold of the patient's ear, including the auditory canal, using quick hardening foam. For this purpose, foam is introduced into the ear of the patient, and hardens therein in a few minutes. The mold is then removed using a string connected to a plug at the distal end of the mold. The mold provides an impression of the patient's ear canal.

The patient's ear mold and hearing aid requirements are then physically sent to a manufacturing site for producing a customized hearing aid for that particular patient. The transfer to the manufacturing site usually takes place by ground shipping, which requires several days. At the manufacturing site, the hearing aid device, customized for fitting into the ear canal of the patient, commonly called an otoplastic, is manufactured based on the mold, and the appropriate electronic components, customized to compensate for the particular hearing impairment of the patient, are placed in the device.

The manufactured hearing aid is then returned to the audiologist, again usually by a ground carrier.

The patient then schedules another visit to the audiologist for fitting of the hearing aid. Often the hearing aid provided by the manufacturer does not feel comfortable to the patient, or does not produce a satisfactory correction of the hearing impairment of the patient. Sometimes the unacceptability of the hearing aid is due to tolerances or imperfections in the manufacturing procedure, but it is also possible that the mold could shrink or become slightly deformed due to environmental changes such as temperature or pressure or mishandling, so that the hearing aid device produced from this mold embodies those changes, and therefore is not acceptable to the patient. Sometimes the necessary changes are relatively minor, and can be done by the audiologist, but often the changes that are necessary to make the hearing aid acceptable to the patient to the patient require that the hearing aid be returned to the manufacturer at the fabrication site. Sometimes the hearing aid can be modified and still used, but in other instances the manufacturing procedure must be done again.

In any event, the first time that the patient has an opportunity to experience a test fitting of the device is after the device has already been manufactured. Sometimes, multiple iterations may be necessary in order to achieve a fitting and hearing impairment correction that are satisfactory to the patient. Each iteration may require modifications to the mold, returning it to the fabrication site, manufacturing a new otoplastic and installing new electronic components therein, and assembly and testing of the finished device, as well as shipping it back to the location of the audiologist, and again scheduling another visit at the audiologist with the patient.

SUMMARY OF THE INVENTION

It is an object of the present invention to provide a method for fabricating a hearing aid device that allows a test fitting by the user before the actual hearing aid device is completely manufactured.

The above object is achieved in accordance with the present invention in a method for fabricating a hearing aid device wherein, at the initial visit of the patient to the dispenser location (audiologist) an ear mold of the patient is produced in the conventional manner, and the mold is scanned at the location of the dispenser, in order to produce a three-dimensional electronic data set that represents the shape of the ear canal. The shape is then modified as needed ("detailing") using a computer algorithm that supports automation thereof. Within this algorithm, it is determined whether the necessary electronic components can be properly placed within a hearing device that will be manufactured according to the scanned data, without the components abutting one another or otherwise interfering with each other. Once it is determined that a hearing aid device can actually be produced based on the three-dimensional data set, the geometry for the hearing aid shape and component placement is created by software.

Next, at the dispenser's location, a shell is produced based on the (possibly modified) three-dimensional data set, and this will be identical to the actual hearing aid in size and in shape, but does not contain any electronic components. The shell simply represents the body (exterior) of the hearing aid that will be actually fabricated. Preferably, this is given to the patient at the same visit, but this may also occur in a closely scheduled follow-up visit such as later in the same day, at the dispenser's location, and the patient can place the shell in his or her ear canal to determine if the fit is comfortable. Any changes that may be suggested by the patient can then be made in the model, and if necessary, another shell can be produced and another test fit can be made by the user. All of this occurs at the location of the dispenser (audiologist), before the mold is sent to the fabrication site, so that delays and expenses associated with iterative modifications at the fabrication site are avoided.

DESCRIPTION OF THE PREFERRED EMBODIMENTS

Figure 1:
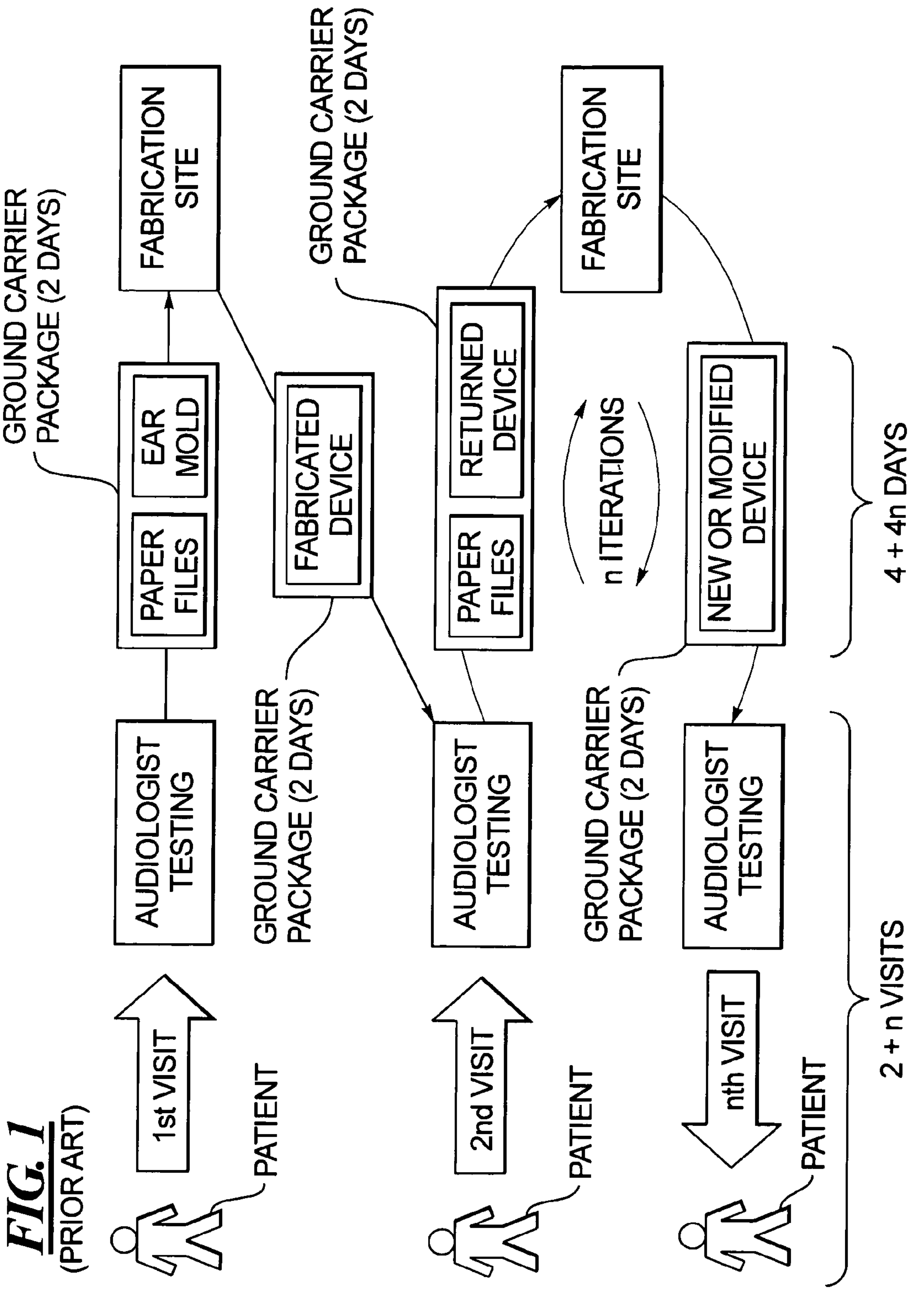
FIG. 1 (PRIOR ART)
FIG. 1, as noted above, schematically illustrates the basic steps in a conventional procedure for producing a hearing aid device.
Figure 2:
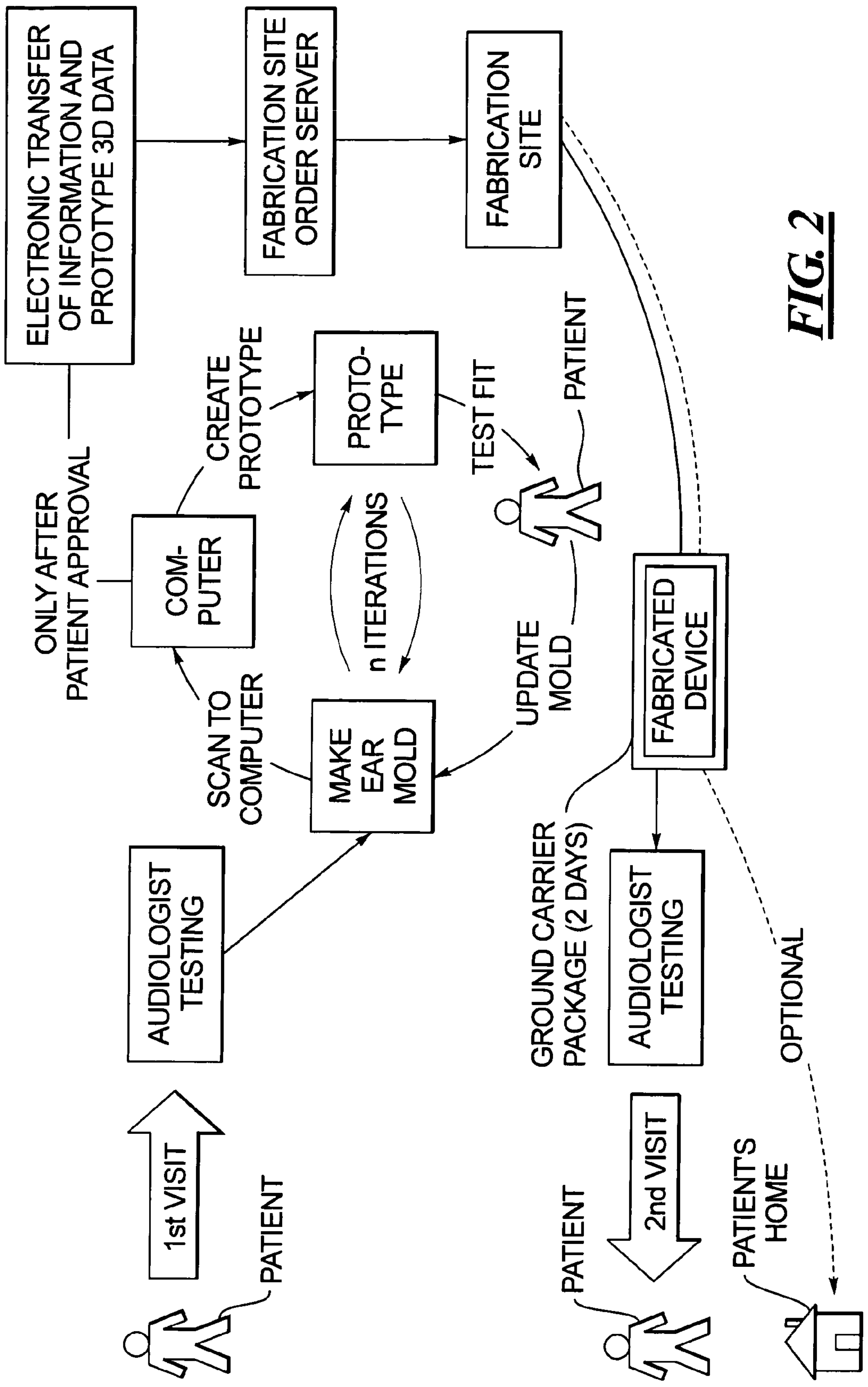
FIG. 2 schematically illustrates the basic steps in a method according to the invention for fabricating a hearing aid device, with test fitting by the user before manufacturing the device at a fabrication site.

As schematically illustrated in FIG. 2, the procedure for fabricating a hearing aid device in accordance with the present invention begins with a patient visit to an audiologist at a dispenser location, wherein a conventional hearing exam takes place to determine hearing aid settings and programs for the electronic components that will be embodied in a hearing aid to correct the particular hearing impairment of the patient. Also in this visit, an ear mold of the patient is made using quick hardening foam.

In accordance with the present invention, this mold is then scanned at the location of the audiologist, in order to generate a three-dimensionally electronic data set that represents the shape of the ear canal of the patient. The shape is modified (trimmed, elongated, reduced, built-up, etc.) by a process known as "detailing." This is a computerized process that includes algorithms to support automation of these steps. The algorithm, or another algorithm, also automatically tests placement sites for the electronic components that will be used, including assuring that the appropriate components can all fit into the device without abutting each other or otherwise interfering with each other. The geometry for the hearing aid shape and component placement is thereby created by software. Such software is commercially available from Siemens Audiologist Technique GmbH, under the designation Auto Modeling and Detailing software.

The next step is to create a test shell, which can be an empty shell or a solid form, of the hearing aid at the dispenser's location. This shell is created from the three-dimensional data set model that has been created, and possibly modified, by scanning the ear mold, and will be identical to the exterior of the actual hearing aid in size and shape, but typically will not contain any electronic components. The shell or solid simply represents the body of the hearing aid (otoplastic). This shell or prototype is given to the user for a test fitting trial, in order to check whether the patient is comfortable with the feel of the prototype. All of this occurs before any mold or other information are sent to the fabrication site.

For construction of the prototype for test fitting, different materials are available which can be used for rapidly creating such a prototype. Quick-hardening plastic, plastic sheets that upon heating can be easily molded into different shapes, and that take a rigid shape upon cooling, memory foam materials, etc. are suitable for this purpose. All can be used to create the hearing aid prototype, and will provide a relatively true feeling to the patient corresponding to the actual hearing aid that is to be manufactured.

By interaction of the patient with the audiologist, any problems associated with the fitting comfort of the prototype can be immediately made known to the audiologist, and appropriate changes can be made on site. Changes are made by the audiologist at the dispenser's location until the patient is comfortable with the hearing aid fitting.

The audiologist may also optimize the shape and size of the mold in order to utilize the maximum depth of the ear canal of the patient. In some cases, this may enable the use of a CIC (Completely In the Canal) device, instead of a larger ITE (In The Ear) device.

Additionally, the prototype shell may contain a rudimentary vent hole and an acoustic tube, through which simulated sounds can be transmitted. This enables the patient to hear a simulated "sample" of how the finished device may sound. The simulated audio would match the frequency response of the finished device, which is tailored to the patient's hearing impairment.

The software that established the parameters used to create the prototype shell that was accepted by the patient is transmitted to the fabrication site, and are used at the fabrication site, for producing the final product. This information can be sent electronically to the manufacturing site, since it is all available in electronic form. This eliminates the need for ground-based shipping of the ear mold, thereby reducing the introduction of possible errors and time delays associated therewith.

The final product is fabricated (once) and is returned to the audiologist by ground shipping. A second visit with the patient is scheduled, where the patient is given the hearing device. Alternatively, the hearing device could be shipped directly to the patient's home.

The procedure in accordance with the invention offers a number of advantages.

The patient is required to make only two visits to the audiologist (dispenser location) in order to receive a hearing aid, encompassing the initial examination, the creation of an ear mold, the test fit of the prototype and (in a follow-up visit) to pick up the finished device.

The dispenser achieves a much higher success rate, compared to the conventional procedure, with respect to customer acceptance of the finished device, due to the initial test fit process before any information is sent to the fabricator.

The opportunity for the patient to see, feel and test fit, and possibly hear a simulated sample of how the finished device will sound, will improve the overall product acceptance by patients.

The ear mold can be adaptively reshaped by the audiologist as needed, guided by immediate feedback from the patient, in order to produce an ear mold that is optimized for patient comfort. The same is true regarding optimizing the ear mold with respect to maximum depth in the ear canal of the patient, thereby possibly enabling the alternative use of a CIC device, as opposed to a larger ITE device.

The overall cycle time for creating the finished product is significantly reduced, due to the transmission of manufacturing specifications (including the three-dimensional geometry of the ear canal) electronically, instead of physically shipping the ear mold by ground carrier.

The accuracy of the manufacturing specifications is not effected by changes that may occur in the physical dimensions of the ear mold. There can be no change in shape of the ear mold due to shrinkage or damage during transit.

The added cost and time involved in re-manufacturing devices for patients who did not accept the first device is avoided. This reduces manufacturing costs, component costs, shipping costs, office visit costs, etc.

The risk that a manufacturer or audiologist will lose a patient, and thus lose a sale, due to unacceptable product quality (i.e., an uncomfortable fit) is significantly reduced, because the customer acceptance is confirmed during the fitting process at the audiologist, rather than waiting for the actual device to be manufactured.

Although modifications and changes may be suggested by those skilled in the art, it is the intention of the inventors o embody within the patent warranted hereon all changes and modifications as reasonably and properly come within the scope of their contribution to the art.

We claim as our invention:

1. A method for fabricating a hearing aid comprising the steps of:

by interaction between a patient having a hearing impairment and an audiologist at a dispenser location, determining electronic component and programming specifications for a circuit for a hearing aid to correct said hearing impairment, producing an ear mold of the patient, scanning said ear mold to generate an electronic 3D data set representing a shape and size of said ear mold, creating a test prototype consisting only of an otoplastic or shell for a hearing aid device from said 3D data set, conducting a test fit with the patient of said prototype and, if necessary, modifying said mold to produce a modified mold and re-scanning said modified mold and creating a modified prototype and test fitting the modified prototype with the patient until an acceptable fit is acknowledged by the patient;

only after said acceptable fit is acknowledged by the patient, electronically transmitting the 3D data set for the prototype that was acceptable to the patient, and said electronic specifications to a fabrication site;

at the fabrication site, manufacturing a hearing aid device having an otoplastic or shell conforming to the 3D data set electronically transmitted to the fabrication site with said circuit embodied in said otoplastic or shell; and sending the hearing aid to a location for pick-up by the patient.

2. A method as claimed in claim 1 wherein the step of sending the hearing aid device to a location for pick-up by the patient comprises sending the hearing aid device to the audiologist at the dispenser location for pick-up by the patient in a follow-up visit.

3. A method as claimed in claim 1 wherein the step of sending the hearing aid device to a location for pick-up by the patient comprises sending the hearing aid device to the patient directly.

4. A method as claimed in claim 1 wherein the step of testing said prototype comprises transmitting simulated audio signals to the patient through an opening in the prototype and, if necessary, additionally modifying the prototype to obtain a sound transmission that is acknowledged as acceptable by the patient.

5. A method as claimed in claim 1 wherein the step of producing said prototype comprises producing a prototype shell from said 3D data set.

6. A method as claimed in claim 1 wherein the step of producing a prototype comprises producing a solid prototype from said 3D set.

7. A method as claimed in claim 1 comprising detailing said 3D data set using a software algorithm before creating said prototype therefrom.

8. A method as claimed in claim 1 comprising employing a computerized algorithm to determine feasibility placement of electronic components, conforming to said electronic specification, in said prototype before creating said prototype.

* * * * *